United States Patent Office 3,518,229
Patented June 30, 1970

3,518,229
POLYFLUOROKETONE/FORMALDEHYDE CO-POLYMERS AND METHOD OF PREPARATION
Vaughn Arthur Engelhardt, Wilmington, Del., assignor to E. I. du Pont de Nemours and Company, Wilmington, Del., a corporation of Delaware
No Drawing. Filed Mar. 11, 1964, Ser. No. 351,242
Int. Cl. C08g 3/00
U.S. Cl. 260—64          31 Claims

ABSTRACT OF THE DISCLOSURE

Polyfluoroketone formaldehyde copolymers and terpolymers with a compound selected from the group consisting of isocyanic acid, n-butyl isocyanate, phenyl isocyanate, pivalolactone, caprolactam, isobutylene, styrene, vinyl butyl ether, ethylene oxide, propylene oxide, dioxolane, N-fluoroiminomalononitrile, acetaldehyde, butyraldehyde, and chloral, said polymers being useful as molding plastics and as protective coatings for metals and other substrates.

---

This invention relates to, and has as its principal objects provision of, new polymeric compositions of matter and a method for the preparation of the same.

The present new compositions of matter are copolymers of formaldehyde with an acyclic polyfluoroketone of general formula $XCF_2-CO-CF_2X'$, in which X and X′ may be the same or different and are of the group: hydrogen, fluorine chlorine and polyfluoroalkyl, chloropolyfluoroalkyl, and alkoxypolyfluoroalkyl in which the alkyl (and associated) groups contain up to a total of 18 carbons.

The copolymers of this invention are prepared by bringing together monomeric formaldehyde and a polyfluoroketone of the above formula at a temperature between $-80°$ C. and $30°$ C. generally in the presence of an anionic catalyst that is effective for the polymerization of formaldehyde. Additional components that are copolymerizable with formaldehyde may also be present.

The acyclic polyfluoroketones used in preparing the novel copolymers have little or no tendency to polymerize under the above conditions in the absence of formaldehyde or other readily polymerizable materials. It is surprising, therefore, that these polyfluoroketones should copolymerize so readily with formaldehyde under these conditions.

The monomeric formaldehyde used in the invention may be prepared in any known manner. The fluorinated ketones are known compounds obtainable as described, for example, in Lovelace et al. "Aliphatic Fluorine Compounds," Reinhold Publishing Co., pp. 182–187 (1958), in Wiley U.S. Pat. 3,091,643, and in Simmons U.S. Pat. 3,029,252.

Examples of usable polyfluoroketones are perfluoroacetone, 1,3-dihydrotetrafluoropropanone,
1,3-dichlorotetrafluoropropanone,
1-chloropentafluoropropanone,
perfluoropentane-2-one,
1,5-dichloro-1,2,2,4,4,5-hexafluoropentane-3-one,
perfluoroheptane-4-one,
perfluorododecane-5-one,
1,7-dihydrododecafluoroheptane-3-one,
1,5-dichloroperfluoropentane-3-one,
1,17-dihydroperfluoroheptadecane-9-one,
1,17-dichloroperfluoroheptadecane-9-one,
4-methoxyperfluorobutane-2-one, and
5-octyloxyperfluoropentane-3-one.

The polyfluoroketones and formaldehyde can be copolymerized in widely varying proportions ranging from 0.01 or less to 1.0 mole of polyfluoroketone per mole of formaldehyde. However, the polyfluoroketone can be present in larger amounts in the copolymerization reaction, to function both as a reactant and as a reaction medium. As noted above, additional polymerizable comonomers can also be present. For example, small amounts (up to 0.2 mole per mole of the formaldehyde) of the following comonomers may be present: isocyanic acid; alkyl and aryl isocyanates, e.g., n-butyl isocyanate and phenyl isocyanate; lactones and lactams, e.g., pivalolactone and caprolactam; vinyl compounds, e.g., isobutylene, styrene, and vinyl butyl ether; epoxides, e.g. ethylene oxide, propylene oxide; dioxolanes; N-fluoroiminonitriles, e.g., N-fluoroiminomalononitrile; and aldehydes, e.g. acetaldehyde, butyraldehyde, chloral, etc.

The copolymerization reaction is normally carried out at atmospheric pressure but pressures above or below atmospheric can be used. A reaction medium inert to formaldehyde and the fluorinated ketone is usually employed. Suitable reaction media are hydrocarbons, especially hydrocarbons containing 3 to 10 carbon atoms, e.g., propane, butane, hexane, decane, cyclopentane, cyclohexane, benzene, and toluene; halogenated hydrocarbons, e.g., carbon tetrachloride, perfluorocyclobutane, dichlorotetrafluoroethane, dichlorodifluoromethane, and perfluorobutylperfluorotetrahydrofuran; dialkyl ethers, e.g., diethyl ether; and nitriles, e.g., acetonitrile. The choice of reaction medium will depend upon the solubility characteristics of the particular polyfluoroketone being reacted.

The catalysts used in preparing the copolymers of this invention are those of the anionic type. Examples are triphenylphosphine, tritolylphosphine, triphenylstibine, triphenylbismuthine, triphenylarsine, aliphatic amines, cesium fluoride, onium compounds of the kind disclosed in U.S. 2,994,687, e.g., tetra-n-butylammonium laurate, trimethylstearylammonium laurate, triethylbenzylammonium acetate, and dimethyl di(hydrogenated tallow) ammonium acetate, etc.

The amount of catalyst employed depends upon the particular reactants being copolymerized, the temperature selected for operation, and the activity of the catalyst. As a rule, the amount of catalyst is at least 0.0003% by weight of the formaldehyde used. Most generally, however, 0.01% by weight of the formaldehyde is adequate to promote the reaction at a satisfactory rate. Larger amounts of catalyst can be used, but, in general, more than 1% of catalyst based on the weight of the formaldehyde has no advantage.

The copolymers of this invention are for the most part resinous in character and are frequently obtained from the reactor in powder or granular form. They vary in melting point and solubility depending upon the nature and amount of polyfluoroketone present. In general, the products have a lower melting point and a lower modulus than formaldehyde homopolymers.

The copolymers undergo gradual degradation on heating above $50°$ C. Products of improved thermal stability are obtained by subjecting the copolymers to: (1) acetylation by heating in acetic anhydride with or without a catalyst such as pyridine or an alkali metal acetate such as sodium acetate; (2) heating with aluminum chloride in boiling carbon tetrachloride or other inert solvent; (3) treating with phosphorus pentachloride in a suitable solvent such as carbon tetrachloride; (4) treating with orthoesters and dimethyl sulfate; and (5) treating with amide acetals such as dimethylformamide dimethyl acetal.

The polyfluoroketone/formaldehyde copolymers are useful as molding plastics and as protective coatings for metals and other substrates. In these various uses the copolymers can be admixed with other polymeric materials and with such substances as pigments, dyes, fillers, plasticizers, ultraviolet light absorbers, and antioxidants. In unstabilized form, the copolymers of this invention are useful as solid sources of hexafluoroacetone.

There follow some nonlimiting examples in which parts are by weight.

The X-ray diffraction data given in the examples were obtained by the Debye-Scherrer method with a North American Philips unit, using copper K α-radiation filtered through nickel to give an effective wave length of 1.54 A. units. In this method the sample is finely ground and packed into a capillary tube which is mounted in a camera having a 114.6 mm. diameter. In the tabulations of diffraction data, "I" refers to the observed intensity values and "d" to the interplanar spacings expressed in angstrom units (A.). The letter S designates the strongest lines recorded, $M_1$, $M_2$, $M_3$, and $M_4$ are lines of medium intensity, the order of intensity decreasing with increasing numerical sequence, F means that the line is faint, and V that it is very faint. "Broad" means a broad, intense line which is still indicative of crystallinity. "Band" means a broad, more diffuse line indicating a low order of crystallinity.

The procedure for differential thermal analysis used in determining the melting points of the copolymers in some of the examples is that described by Vassallo and Harden, Anal. Chem., 34, 132 (1962). In this procedure the melting point is taken as the endothermic peak corresponding to the melting point taken on a metal block to confirm the type of endothermic activity. Stability data, where given, were determined by thermogravimetric analysis in the manner described by Vassallo in Anal. Chem., 33, 1823 (1961).

In determining reaction rate constants for thermal degradation, a first order reaction is assumed. This may be expressed mathematically in the form of the differential equation:

$$\frac{-dw}{dt} = kw$$

in which $t$ is the elapsed time from the beginning of the decomposition reaction, $w$ is the weight of the material which remains undecomposed at time $t$, and $k$ is the rate constant for the equation. Values of weight remaining are recorded along with elapsed time by an automatic semimicro balance. These values are plotted as the logarithm of the weight percent of undegraded polymer vs. the corresponding time since the beginning of the degradation. The value of the reaction rate constant for thermal degradation is 2.303 times the slope of the plotted line, and is reported for straight line portions of the curve with the weight percentage range indicated.

The units of $k$ are reciprocal minutes if the time, $t$, is in minutes, and therefore a $k$ value of 0.01 reciprocal minutes is equivalent to 1% per minute. From the values of two points on the straight line portion of the curve under consideration, the reaction rate constant as percent/min. is calculated conveniently from the expression:

$$k = \frac{(\log \text{wt. \% at } t_1 - \log \text{wt. \% at } t_2) \times 2.303 \times 100}{t_2 - t_1}$$

EXAMPLE 1

A nitrogen-dried reactor equipped with a solid carbon dioxide/acetone cooled condenser and a stirrer was charged with about 250 parts of dry pentane and 0.2 part of triphenylphosphine. Dry gaseous formaldehyde, prepared by pyrolysis of α-polyoxymethylene, was then passed into the reactor which was maintained at about 0° C. Simultaneously, and for a period of 10 minutes, eight parts of hexafluoroacetone was introduced into the reactor. Introduction of gaseous formaldehyde was continued for a total of two hours. During this period 12 parts of a solid polymer (A) separated from the reaction mixture and 9.5 parts of a second solid polymer (B) separated on the finger of the condenser. These polymers were then heated at 56° C. at 0.3 mm. pressure for several hours and analyzed. Polymer A was found to contain 13.75% F and Polymer B was found to contain 1.10% F, which correspond to —$CH_2O$—/—$C(CF_3)_2O$— ratios of 22 for Polymer A and 342 for Polymer B. Polymer A melted at about 172° C. and B at about 180° C.

When high molecular weight polyformaldehyde is exposed to dry hexafluoroacetone, no hexafluoroacetone is adsorbed. This indicates that the above polymers are true hexafluoroacetone/formaldehyde copolymers rather than formaldehyde polymer containing adsorbed hexafluoroacetone.

When Polymer A was heated at 53° C. under 0.3 mm. pressure, there was an observed 68% loss in weight in 95 minutes, and after 7 hours the loss in weight was 85%. The loss in weight was due in part to liberation of hexafluoroacetone. These copolymers are useful as solid sources of hexafluoroacetone.

EXAMPLE 2

Anhydrous gaseous formaldehyde, generated from cyclohexyl hemiformal as described in U.S. Pat. 2,848,500, was passed into a 250-ml., round-bottomed flask at 2.1 parts/min. as hexafluoroacetone was simultaneously distilled from a trap into the same flask at 11.2 parts/min. on the average. The mixture of gases passed from this mixing flask into the top of a 500-ml. reactor provided with a paddle stirrer and thermometer, and containing 137 parts of n-heptane previously dried with silica gel and $2.5 \times 10^{-3}$ part of dimethyl di-hydrogenated tallow) ammonium acetate (catalyst) and cooled in an ice bath. The reaction mixture in the reactor was protected from the atmosphere by a stream of nitrogen passing through a Y-tube connected to the reactor and to a bubbler containing mineral oil. White polymer began to form at once, and the temperature rose from 3° C. to 10° C. during five minutes' reaction time. There were employed totals of 10.5 parts of formaldehyde and 56 parts of hexafluoroacetone. The polymerization mixture was poured onto a filter, washed with ether and then kept in a vacuum oven overnight at 50° C. There was obtained 1.8 parts of a solid designated Polymer A. The reactor was purged with nitrogen overnight and the white, friable, solid film which had collected was scraped from the wall, washed with ether, and vacuum oven-dried to give 6.8 parts of a white, friable, solid product designated Polymer B. The ether washings were evaporated by impinging a stream of nitrogen upon the surface to give a translucent, colorless film which was loosened by water. Self-supporting, weak sections of this film were recovered by flushing the flask. After being dried, 0.25 part of polymer was recovered. This was designated Polymer C. The various portions of polymer recovered were analyzed with the following results:

|  | Percent | | | —$CH_2O$—/—$C(CF_3)_2O$— ratio in copolymer | |
| --- | --- | --- | --- | --- | --- |
|  | C | H | F | By C analysis | By F analsyis |
| Polymer A | 26.18 | 1.71 | 56.66 | 1.8 | 1.2 |
| Polymer A [1] | 24.91 | 1.51 | 54.73 |  |  |
|  | 24.92 | 1.71 | 51.91 | 1.2 | 1.6 |
|  |  |  | 52.18 | (av.) | (av.) |
|  |  |  | 54.99 |  |  |
| Polymer B | 25.99 | 1.84 | 52.44 | 1.7 | 1.7 |
| Polymer B [1] | 26.03 | 1.61 | 53.82 | 1.7 | 1.5 |
|  | 25.85 | 1.65 | 53.62 | (av.) | (av.) |
| Polymer C [2] | 27.91 | 2.59 | 48.72 | 2.8 | 2.3 |

[1] Reanalysis at approximately six weeks after preparation.
[2] This analysis carried out on sample four months after preparation.

The X-ray diffraction patterns obtained on Polymers A, B, and C are given in Table I.

TABLE I

| Polymers A and B (Ex. 2) | | Polymer C (Ex. 2) | |
|---|---|---|---|
| I | d | I | d |
| $M_3$ | 6.964A | $M_3$ | 6.910A |
| $M_2$ | 6.458 | $M_3$ | 6.365 |
| $M_1$ | 5.336 | $M_2$ | 5.273 |
| S | 4.951 | S | 4.844 |
| $M_3$ | 4.691 | $M_3$ | 4.247 |
| $M_3$ | 4.329 | $M_2$ | 3.831 |
| $M_3$ | 3.880 | F | 3.463 |
| F | 3.517 | $M_2$ | 3.184 |
| $M_2$ | 3.195 | $M_3$ | 3.015 |
| $M_3$ | 3.045 | F | 2.657 |
| F | 2.838 | $M_3$ | 2.466 |
| F | 2.665 | $M_3$ | [2] 2.257 |
| F | 2.547 | $M_3$ | [2] 2.189 |
| F | [1] 2.263 | F | 1.943 |
| F | 1.897 | | |
| F | 1.720 | | |

[1] Band.
[2] Broad.

Polymers A and B showed good crystallinity, whereas Polymer C had crystalline and amorphous regions.

Polymers A and B when subjected to infrared analysis showed the following absorption peaks: Polymer A at $3.42\mu$ corresponding to aliphatic carbon-hydrogen absorption, at 7.56, 7.75, 8.13, 8.65, 8.73, 9.17, 9.42, 9.50, 9.77, 10.00, 10.38, and $10.70\mu$ attributable to the carbon-oxygen ether linkage and aliphatic carbon-fluorine absorptions. At 13.05, 13.69, 14.05, and $14.18\mu$ there are absorptions not characteristic of particular bonds but rather of the polymer itself. Polymer B had peaks at 3.0 (trace), 3.35, 3.42, 7.55, 8.18, 8.73, 9.20, 9.50, 9.87, 10.05, 10.72, 13.07, 13.72, 13.88, and $14.10\mu$.

On a copper block Polymers A and B melted at 80° C. and Polymer C melted at 74° C.

EXAMPLE 3

Example 2 was repeated, except that the formaldehyde rate was 2 parts/min., the hexafluoroacetone, 3.69 parts/min. on the average, the reaction medium was 319 parts of carbon tetrachloride and the catalyst was 0.025 part of triphenylphosphine. There were employed 90 parts of formaldehyde and 166 parts of hexafluoroacetone. The polymerization temperature was 23–25° C. and the polymerization time 45 minutes. Sixty percent of the catalyst was added at the start and the remaining 40% after 9 minutes.

White polymer clung to the walls of the glass reactor in swirls and upon removal was found to be a non-tacky gum. After an ether wash and vacuum oven-drying at 45° C. overnight, plus two hours at 52° C., the polymer weighed 9.9 parts and was a crumbly white solid designated Polymer A. Evaporation of the wash solvent gave 2.3 parts of a gummy white mass designated Polymer B. The filter paper which had been used in isolating the polymer became impregnated with the soluble polymer and became stiffer on drying than before use. It was very difficult to wet with water and after floating on water overnight was more difficult to tear than untreated paper immediately after immersion in water.

Polymer A exhibited a melting point of 83° C. measured by differential thermal analysis. On a copper block, the stick temperature was 70° C. Polymer B was tacky at room temperature. The two portions of polymer recovered were analyzed with the following results:

| | Percent | | | —$CH_2O$—/—$C(CF_3)_2O$— ratio in copolymer | |
|---|---|---|---|---|---|
| | C | H | F | By C analysis | By F analysis |
| Polymer A | 25.28 | 1.51 | 52.96 | 1.3 | 1.7 |
| Polymer A [1] | 25.90 | 1.82 | 50.21 | 1.6 | 2.0 |
| Polymer B | 30.08 | 2.51 | 46.27 | 4.7 | 2.7 |

[1] Analysis after two weeks.

Infrared absorption was similar to that of the polymers of Example 2. In a potassium bromide wafer, Polymer A exhibited absorption peaks at 3.38, 3.43, 7.52, 8.15, 8.65, 8.74, 9.17, 9.42, 9.50, 9.77, 10.00, 10.40, 10.69, 11.10, 13.05, 13.70, 14.20, and $14.59\mu$. As a 5-mil cold-pressed film, this same polymer exhibited absorption peaks at 3.03 (weak), 2.50, 3.34, 3.43, 4.23, 5.52, 6.74, 6.99, 7.24 (off-scale $7.45–11.15\mu$), 13.04, 13.74, 14.17, and $14.56\mu$. Polymer B as a smear on rock salt showed peaks at 3.03 (very weak), 3.42, 3.5, 5.81 (weak), 6.77, 7.01, 7.28, 7.60, 7.78, 8.17, 8.70, 9.00, 9.50, 10.00, 10.70, 11.03, 13.10, 13.70, and $14.6\mu$. Polymer A was insoluble in boiling acetone, dimethylformamide, dimethyl sulfate, water, and at 100° C. insoluble in 10% sodium hydroxide, acetic anhydride, or concentrated nitric acid. Polymer A was dissolved, however, at 100° C. by s-dichlorotetrafluoroacetone hydrate containing 2% triethylamine. Addition of water to the solution produced a white precipitate, which was soluble in acetone, in contrast to original Polymer A. After one hour in nitric acid at 100° C., the polymer formed a film on the edge of the tube on cooling. Under a pressure of 500 lb./sq. in. at 70° C. a sample of raw Polymer A was pressed onto aluminum sheet to give a 1-mil translucent coating which adhered to the substrate. This property combined with its insolubility in various solvents makes this polymer useful as a protective coating for metals.

Table II gives the X-ray diffraction pattern of Polymers A and B.

TABLE II

| Polymer A (Ex. 3) | | Polymer B (Ex. 3) | |
|---|---|---|---|
| I | d | I | d |
| S | 4.643A | F | 6.411A |
| S | 4.329 | $M_2$ | 5.433 |
| S | 3.880 | $M_2$ | 5.007 |
| F | 3.517 | S | 3.880 |
| S | 3.206 | $M_3$ | 3.241 |
| $M_3$ | 3.035 | F | 3.056 |
| F | 2.838 | $M_3$ | 2.957 |
| F | 2.712 | F | [2] 2.252 |
| $M_3$ | 2.590 | $M_3$ | 1.886 |
| $M_3$ | 2.493 | $M_3$ | 1.691 |
| $M_3$ | [1] 2.285 | V | 1.550 |
| $M_3$ | [1] 2.199 | V | 1.346 |
| $M_3$ | [1] 2.034 | | |
| $M_3$ | [1] 1.886 | | |
| $M_3$ | [1] 1.735 | | |

[1] Broad.
[2] Band.

Polymer A was judged to contain both crystalline and amorphous regions. Polymer B was judged to have good crystallinity.

One part of Polymer A was heated under a nitrogen blanket in 21.6 parts of acetic anhydride and 1.96 parts of pyridine at 100° C. for one hour. Upon filtration, washing with acetone, and vacuum oven-drying for three hours at 45° C., there was recovered 0.07 part of polymer containing 32.38% carbon, 4.21% hydrogen, and 26.36% fluorine and having a stick temperature on a copper block of 165° C. This was designated Polymer C. Infrared analysis on a 5.5-mil film, pressed at room temperature and high pressure, showed an optical density of 0.066 for —OH (2.90 to $3.10\mu$), compared with an optical density of 0.123 for the $2.54\mu$ calibration absorption band. The ratio of the optical densities is then $$\frac{OH}{2.54\mu} = 0.54$$

Untreated Polymer A as a 5-mil film had an optical density of 0.240 for —OH ($3.03\mu$), compared to 0.022 for the $2.54\mu$ reference band to give an $$\frac{OH}{2.54\mu} = 10.9$$

This indicates a 20-fold decrease in hydroxyl content upon acetylation. This, taken with the fact that Polymer C showed absorption in the infrared at $5.7\mu$ for acetate carbonyl, indicated that the acetylation produced a product which was end-capped.

One part of Polymer A was heated at 100° C. for one hour in 17.7 parts of triethyl orthoformate and 1.35 parts of dimethyl sulfate under a blanket of nitrogen. After filtration, acetone wash, and vacuum oven-drying as with Polymer C, there was obtained 0.4 part of solid polymer, containing 26.36% carbon, 1.82% hydrogen, and 49.69% fluorine, which stuck to a copper block at 70° C. It was designated Polymer D. Polymers A, C, and D were studied by thermal gravimetric analysis programmed at 6° C./min. with the following results:

|  | 90% weight remaining | |
|---|---|---|
|  | Temp. (° C.) | Time (min.) |
| Polymer A | 113 | 15 |
| Polymer C | 207 | 30 |
| Polymer D | 126 | 17 |

EXAMPLE 4

Example 2 was repeated, except that the formaldehyde flow rate was 0.18 part/min., the hexfluoroacetone rate was 4.15 parts/min. on the average, the reaction medium was 623 parts of cyclohexane, 0.104 part of triphenylphosphine in 15.6 parts of cyclohexane was added as catalyst and the polymerization temperature was 25° to 27.5° C. The reaction time was 40 minutes with 10 minutes of additional stirring after the flow of monomers had ceased. Fifty percent of the catalyst was added at the start, 25% at 18 minutes, and the rest at 27.5 minutes. There was added to the reactor 3.96 parts of methanol before the polymer was isolated. A total of 166 parts of hexafluoroacetone and 7.2 parts of formaldehyde was employed. After being washed on a filter with 906 parts of petroleum ether and vacuum oven-dried 3.5 hous at 50° C., the snow-white, friable solid consisted of 28.25 parts and was designated Polymer A. Analysis indicated 25.17% carbon, 1.44% hydrogen, and 57.23% fluorine. From carbon analysis this polymer contains —$CH_2O$—/—$C(CF_3)_2O$— in the ratio of 1.3. By fluorine this ratio is 1.1 The melting point by differential thermal analysis was found to be 81° C. A film compression-molded at 90° C. was thin, waxy in feel, and brittle. Infrared absorption was similar to the polymers of Examples 2 and 3. In a mineral oil mull this polymer exhibited absorption at 3.0 (weak), 7.48, 8.15, 8.70, 9.50, 9.80, 10.72, 13.05, 13.69, 13.85, and 14.58$\mu$.

One part of Polymer A was refluxed one hour under nitrogen with one part of phosphorus pentachloride dissolved in 39.9 parts of carbon tetrachloride. The insoluble polymer was filtered, washed with 227 parts of carbon tetrachloride, and vacuum oven-dried overnight in an oven that cooled from 40° C. to room temperature with the heat off. There was recovered 0.88 part of polymer containing 24.95% carbon, 1.54% hydrogen, 55.30% fluorine, no chlorine, and a trace of phosphorus. Infrared absorption was similar to Polymer A. A 5 to 7-mil self-supporting film was molded at 45° C. at 152,000 lb./sq. in. and was observed directly by the infrared absorption technique. There was no absorption at 2.9–3.0$\mu$ characteristic of hydroxyl. Adsorptions were noted, however, at 3.32, 3.39, 3.91, 4.05, 4.23, 4.34, 4.55, 5.16, 5.23, 5.45, 5.75, 6.27, 6.73, 6.98, and 13.05$\mu$. The pattern was off-scale at 7.40–11.0$\mu$ and 13.55–14.75$\mu$. In a mineral oil mull, absorptions were noted at 3.0, 3.17, 6.10, 7.50, 7.75, 8.15, 8.50, 8.75, 9.40, 9.53, 9.80, 10.02, 10.25, 10.39, 10.73, 13.05, 13.70, 14.18, and 14.58$\mu$. In a potassium bromide wafer this polymer exhibited absorption at 7.47, 7.72, 8.10, 8.43, 8.68, 9.15, 9.35, 9.47, 9.70, 9.97, 10.34, 10.67, 13.02, 13.65, 14.13, and 14.55$\mu$. This polymer exhibited a melting point of 93° C., as measured by differential thermal analysis. It was designated Polymer B. A parallel experiment with the phosphorus pentachloride omitted gave 0.22 part of polymer containing 25.26% carbon, 1.48% hydrogen, and 58.95% fluorine. It was designated Polymer C.

One part of Polymer A was refluxed one hour in 39.9 parts of carbon tetrachloride containing 0.1 part of aluminum chloride. There was obtained 1.05 parts of polymer upon filtration, washing with 453 parts of carbon tetrachloride, and vacuum oven-drying as with Polymer B. It contained 15.01%, 13.20%, and 13.35% carbon, 2.98%, 3.27% and 3.43% hydrogen, 46.92% fluorine, 11.96% chlorine, and 1 to 5% aluminum. The polymer exhibited a melting point of 87° C., as measured by differential thermal analysis: By the potassium bromide wafer technique, infrared absorption peaks were noted at 7.49, 7.73, 8.10, 8.70, 9.39, 9.48, 9.75, 9.98, 10.37, 10.70, 13.02, 13.68, 14.15, and 14.57$\mu$. In a mineral oil mull, peaks were observed at 3.0, 6.10, 7.70, 8.13, 8.70, 9.43, 9.54, 9.78, 10.02, 10.27, 10.73, 13.05, and 13.71$\mu$. It was designated Polymer D.

One part of Polymer A was allowed to stand at room temperature in 44 parts of benzene overnight. To the slurry was then added 8.85 parts of dimethylformamide dimethyl acetal and the system was refluxed under a nitrogen blanket for four hours and allowed to stand at room temperature overnight. The solid was filtered, washed with acetone, and vacuum oven-dried at 60° C. for four hours. There was obtained 0.1 part of solid designated Polymer E.

Polymers A, B, C, D, and E were studied by thermal gravimetric analysis programmed at 6° C./min. with the following observed:

|  | 90% weight remaining | |
|---|---|---|
|  | Temp. (° C.) | Time (min.) |
| Polymer A | 82 | 10 |
| Polymer B | 138 | 19 |
| Polymer C | 95 | 12 |
| Polymer D | 130 | 18 |
| Polymer E | 177 | 26 |

Five-tenths part of Polymer A was heated under 125 mm. pressure for one-half hour at 110–125° C., then 1.5 hours at 150° C. to give 0.415 part of liquid in a cold trap and a lower amount of white solid on the upper wall of the reactor. The liquid was identified by gas chromatography to be hexafluoroacetone. The white solid contained 36.15% carbon and 6.57% hydrogen, and showed absorption peaks in the infrared at 3.35, 3.40, 6.77, 6.95, 7.10, 7.20, 8.05, 9.05, and 10.69$\mu$ corresponding to polyoxymethylene with additional peaks at 7.89, 9.75, and 12.45$\mu$ attributable to carbon-fluorine linkages. This experiment demonstrates the utility of unstabilized hexafluoroacetone/formaldehyde copolymers as sources of hexafluoroacetone.

EXAMPLE 5

Example 4, paragraph 1, was duplicated with the variations that the formaldehyde flow rate was 2.01 parts/min., the hexafluoroacetone rate was 2.08 parts/min., the monomer addition time was 20 minutes, and the catalyst (0.104 part of triphenylphosphine in 15.6 parts of cyclohexane) was added in four equal portions, at the start, at 2 minutes, at 8 minutes, and at 13 minutes. At the end, 7.92 parts of methanol was added, and the polymer was washed with 77.9 parts of cyclohexane followed by 453 parts of petroleum ether and dried in a vacuum oven overnight that cooled from 40° C. to room temperature. There was obtained 15 parts of white polymer containing 29.18% carbon, 3.19% hydrogen and 38.85% fluorine. From the carbon analysis, the —$CH_2O$—/—$C(CF_3)_2O$— ratio is 3.8, but from the fluorine analysis, it is 4.3. The polymer softened and became tacky on a copper block at 55–60° C., but was nontacky at 90° C., remaining soft but not fluid at 210° C. This material can be used as a high temperature packing where inertness to solvents, bases and acids is required.

EXAMPLE 6

Twenty-three parts of formaldehyde, generated as in Example 2, was condensed at −78° C. and poured into 70.8 parts of sodium-dried diethyl ether cooled in a —78° C. bath in a reactor protected from the air by a nitrogen blanket kept at positive pressure by a mineral oil bubbler on the end of the system. There was then added under a nitrogen blanket 2.49 parts of hexafluoroacetone freshly distilled into a cold trap. As the slightly cloudy solution that resulted was stirred, 0.0052 part of triphenylphosphine in 0.78 part of cyclohexane was added without appreciable temperature rise, —68° to —67° C. At 3 minutes 0.026 part of triphenylphosphine in 3.9 parts of cyclohexane was added with a resulting 7° C. temperature rise to —60° C. and more polymer formation. At 5 to 5.5 minutes, 0.026 part of catalyst in 3.9 parts of cyclohexane was added without further elevation of temperature for a total of 0.0572 part of triphenylphosphine in 8.58 parts of cyclohexane. A thick slurry was present at this point. Stirring in a —78° C. bath was continued for a total of one hour. The white polymer which formed was filtered, washed well with acetone, and vacuum oven-dried overnight at room temperature. There was obtained 12.1 parts of polymer.

The polymer contained 37.97% carbon, 6.29% hydrogen, and 8.74% fluorine. From the carbon analysis, the —CH$_2$O—/—C(CF$_3$)$_2$O— ratio is 44 and by the fluorine analysis, 38. Infrared absorption indicated a preponderance of saturated C—H at 3.35 and 3.41$\mu$, —C—O— at 8.07, 9.10, 10.7, and 11.5$\mu$ as in polyoxymethylene. Shoulders at 8.18 and 8.6$\mu$ suggest the C—F bond. Additional absorption at 13.88$\mu$ is in the same range as the $$-CH_2O-/-C(CF')_3O-$$

copolymers with much lower ratios. In thermal gravimetric analysis, programmed at 6° C./minute as in Example 4, this polymer had 90% weight remaining at 95° C. in 12 minutes.

The above copolymer softens on a copper block at 160° C. and forms a melt at 172° C. From this melt filaments of considerable strength were drawn at 180° to 190° C. By differential thermal analysis, a melting point of 173° C. was observed and on freezing and reheating a melting point of 174° C. was recorded. The melt contained 0.67% fluorine. The cooled melt was tough and strong, indicating usefulness as a molding plastic, for films, fibers, and for massive articles. A tough, translucent film 1.5 mils in thickness was molded at 180° C./1000 lb./sq. in. An inherent viscosity of 0.09 was observed at 0.5% concentration and 60° C. in p-chlorophenol containing 2% α-pinene.

EXAMPLE 7

Into a 250 ml. glass reactor, cooled in a —78° C. bath, there was distilled under nitrogen 124.5 parts of hexafluoroacetone. As the hexafluoroacetone was stirred rapidly at —71° C., 11.0 parts of liquid monomeric formaldehyde at —78° C. was poured in under a nitrogen blanket from the trap into which it had just been condensed from generation from cyclohexyl hemiformal, as described in Example 2. There was immediate and vigorous polymerization of the liquid stream of formaldehyde so that a solid plug extended into the liquid hexafluoroacetone. The temperature rose to —64° C. and after 25 minutes in a —78° C. bath, 0.0104 part of triphenylphosphine in 1.56 parts of cyclohexane was added, with no observed temperature rise. After one hour the excess hexafluoroacetone was allowed to evaporate, the system warmed, and friable polymer which had formed in the hexafluoroacetone phase was scraped away from the original tough plug, and was washed with 453 parts of cyclohexane and vacuum oven-dried 30 minutes at 60° C., then overnight as the oven cooled from 60° C. to room temperature.

There was obtained 9.3 parts of polymer containing 24.59% carbon, 1.21% hydrogen, and 55.46% fluorine.

This corresponds, by fluorine analysis, to 80.7% by weight of hexafluoroacetone or a $$-CH_2O-/-C(CF_3)_2O-$$

ratio of 1.3. By carbon analysis it is 84.2% by weight of hexafluoroacetone or a —CH$_2$O—/—C(CF$_3$)$_2$O— ratio of 1.0. The polymer plug (2.9 parts) which formed initially and before thorough mixing had taken place contained 39.03% carbon and 6.10% hydrogen, which corresponds to 5.3% by weight of hexafluoroacetone. The —CH$_2$O—/—C(CF$_3$)$_2$O— ratio is 99.

EXAMPLE 8

Into 70.8 parts of sodium-dried ether at —78° C. contained in a 500 ml. flask there was poured, under anhydrous conditions and a nitrogen blanket, 3.96 parts of freshly distilled vinyl n-butyl ether, 24.9 parts of hexafluoroacetone condensed from a pressure cylinder, and 13.8 parts of freshly generated liquid formaldehyde (see Example 2). With the addition of the formladehyde, instantaneous initiation of the polymerization began and a loud report was heard. The temperature rose from —70° C. to —58° C. White gummy polymer collected on the wall of the 500 ml. flask. After a total of 40 minutes in the —78° C. bath, the system was permitted to warm to 10° C. The supernatant liquid was then poured off and the polymer scraped out and washed thoroughly with cyclohexane and acetone. It was vacuum oven-dried at 60° C. for 30 minutes, then in the oven three days as it cooled from 60° C. to room temperature.

There was obtained 19.7 parts of a tan-colored polymer (Polymer A) melting on a copper block at 96° C. and analyzing 25.55% carbon, 1.48% hydrogen, and 54.05% fluorine. A portion of Polymer A was heated 40 minutes in benzyl alcohol containing 2% tri-n-butylamine. There was recovered in 14.6% yield, a base-stable fraction (Polymer B) which contained 25.29% carbon, 1.42% hydrogen, and 56.07% fluorine, corresponding to a —CH$_2$O—/—C(CF$_3$)$_2$O—/—CH$_2$CH(OC$_4$H$_9$)— ratio of 74/62/1. Polymer B melted on a copper block at 97° C., and exhibited a differential thermal analysis melting point of 96° C. and a decomposition rate constant at 222° C. of 0.03%/min., with 96.7% remaining after two hours at the 222° C. temperature, as determined by thermal gravimetric analysis. An initial loss of 2% during heating at 222° C. in 15 minutes was sustained before determination of the constant. Polymer A of this example, after an initial loss of 71% in reaching test temperature, exhibited a decomposition rate constant at 222° C. of 0.2%/min. from 100% to 93.9% remaining and then a constant of 0.06%/min. to 90.8% remaining, based on initial weight at 222° C. A formaldehyde/hexafluoroacetone copolymer, such as Polymer A of Example 4, was completely destroyed by this base treatment and in a thermal gravimetric test was practically all decomposed by the time the temperature reached 222° C.

The ether/acetone/cyclohexane filtrate from the isolation and washing of Polymer A was evaporated by impinging a nitrogen stream on the surface of the system to give 2.4 parts of an almost white, friable solid (Polymer C) which melted on the copper block at 62° to 70° C. and contained 30.80% carbon, 2.22% hydrogen, and 48.74% fluorine, corresponding to a $$-CH_2O-/-C(CF_3)_2O-/-CH_2CH(OC_4H_9)-$$

ratio of 4.8/3.6/1.

Polymer C was tested by thermogravimetric analysis isothermally at 222° C. with the following results. After an initial loss of 34.2% in the 19 minutes required to heat it to the 222° C. test temperature, the 65.8% remaining exhibited decomposition rate constants of 1.0%/min. to 86.4% remaining, of 0.2%/min., 86.4 to 81.4% remaining, and 0.07%/min., 81.4 to 73.4% remaining.

For this polymer there was observed a melting point of 71° C. by differential thermal analysis.

EXAMPLE 9

Under anhydrous conditions and under an atmosphere of nitrogen a solution of 46.5 parts of s-dichlorotetrafluoroacetone in 70.8 parts of sodium-dried ether was cooled in a −78° C. bath and 8.2 parts of freshly generated (Example 2) liquid formaldehyde at −78° C. was poured in to give a clear solution. Addition of 0.01 part of triphenylphosphine in 1.56 parts of cyclohexane brought about immediate polymerization with a temperature rise from −72° to −30° C. in two minutes. A colorless gel filled the system. After two hours there was added 79.2 parts of methyl alcohol (precooled to −78° C.) and the system allowed to warm to room temperature. After the system was subjected to 100 mm. pressure and the bath temperature raised to 30° C., tthe polymer was washed on a filter with 453 parts of ether and 390 parts of cyclohexane. Solvent was removed overnight in a vacuum oven at room temperature to leave 31 parts of a white solid analyzing 22.71% carbon, 1.43% hydrogen, 26.61% fluorine, and 25.18% chlorine. The halogen content corresponds to a —$CH_2O$—/—$C(CClF_2)_2O$— ratio of 2.8, whereas the carbon analysis would indicate 1.8. After one month's storage, this polymer was reanalyzed and found to contain 21.26% carbon, 1.43% hydrogen, and 31.95% fluorine, corresponding to a —$CH_2O$—/—$C(CClF_2)_2O$— ratio of 1.5 by fluorine content and 1.1 by carbon content. The solid was tacky at 60° to 90° C. on a copper block and melted and disappeared at 100° to 110° C. A melting point of 103° C. was observed by differential thermal analysis. When a portion was heated one hour in refluxing carbon tetrachloride containing phosphorous pentachloride, 65% of the solid was recovered. This now contained 20.60% carbon, 0.83% hydrogen, 31.09% chlorine, and 32.61% fluorine. A melting point of 121° C. was observed by differential thermal analysis. In a thermogravimetric analysis programmed at 6° C./min., the treated polymer had 90% remaining at 106° C. after 14 minutes, whereas the original polymer had 90% remaining at 81° C. after 10 minutes.

EXAMPLE 10

In the same polymerization procedure as in Example 2, 30.8 parts of anhydrous gaseous formaldehyde at 1.4 parts/min. and 166 parts of gaseous hexafluoroacetone at 7.55 parts/min. on the average were mixed and passed continuously into the top of a reactor containing 573.5 parts of sodium-dried ether and 0.052 part of triphenylphosphine at the start. The system was cooled with a −43° to −51° C. bath as the reactor temperature varied from −45° to −23.7° C. over the 22 minute addition period. Additional 0.052-part portions of catalyst in 7.08 parts of ether were added at 5 minutes, 12 minutes, 18.5 minutes, and 28 minutes for a total of 0.26 part of catalyst. Stirring was stopped at 35 minutes and the system was held at −23.7° to −40° C. until 60 minutes from the start, at which point 39.6 parts of methanol previously cooled to −40° C. was added and the system allowed to warm to room temperature. After the ether had been decanted, the clear gel on the walls was scraped onto a filter, washed with 792 parts of methanol and dried in a vacuum oven overnight at room temperature to give 99.3 parts of a snow-white, friable copolymer containing 24.52% carbon, 1.83% hydrogen, and 54.13% fluorine. From the carbon analysis, the

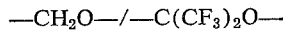
—$CH_2O$—/—$C(CF_3)_2O$— ratio is 1.0 and by the fluorine analysis is 1.5. On a copper block, this polymer melted at 70°–80° C. with decomposition. In a 6° C./min. programmed thermogravimetric analysis, 90% of the polymer remained at 76° C. after 9 minutes.

In a thermogravimetric analysis at 75° C., a thermal decomposition rate of 3.4%/min. was observed from 100% to 59.9% remaining, then a rate of 2.1%/min. from 59.9% to 21.4% remaining.

To show the copolymer is useful as a solid source of hexafluoroacetone the following experiment was carried out:

In a 100-ml. stainless steel bomb, 8.2 parts of the polymer of Example 10, 16.8 parts of cyclohexane, and 0.2 part of di-tert-butyl peroxide were heated under autogenous pressure at 135° C. for 8 hours. There was recovered 24 parts of a clear liquid, of which 15% was shown to be 1,1,1,3,3,3-hexafluoro-2-cyclohexyl - 2 - propanol when the sample was analyzed by gas chromatography in comparison with an authentic sample. The authentic sample of 1,1,1,3,3,3,-hexafluoro-2-cyclohexyl-2-propanol, prepared by a similar reaction with the exception that hexafluoroacetone was used in place of the copolymer, had a boiling point of 73°–75° C./35 mm., $n_D^{25°\ C.}$=1.3855, and gave the following analysis:

Analysis.—Calcd. for $C_9H_{12}F_6O$ (percent): C, 43.20; H, 4.80; F, 45.60. Found (percent): C, 43.52, 43.63; H, 5.04, 5.11; F, 45.19, 45.41.

The $F^{19}$ nuclear magnetic resonance spectrum of the authentic sample used for comparison showed only the expected single peak and infrared absorption was in keeping with the designated structure with absorption peaks at 2.78, 2,86, 3.38, 3.51, 6.90, 7.80–8.48, 8.70, 9.10, 9.30, 9.48, 10.20, 10.48, 10.86, 11.11, 11.26, 11.72, 12.30, 13.12, 13.78, and 14.70μ.

EXAMPLE 11

A 500-ml. round-bottomed flask was fitted as a reactor with a reflux condenser cooled by water at 0° C. circulating through it, a paddle stirrer, a thermometer, and, at the top, a gas inlet. The entire system was protected from the atmosphere by means of nitrogen and all glassware was heated in a 120° C. oven beforehand. Into the reactor, cooled with an ice bath, was poured under nitrogen 88.7 parts of freshly distilled ethylene oxide and to this was added 0.25 part of tetraethylammonium chloride previously dried overnight at 90° C. in a vacuum oven. As the reactor was stirred and cooled, a gaseous mixture of formaldehyde, freshly generated as in Example 2, and hexafluoroacetone, distilled from a trap after passing through a 2-foot x 1-inch column of Molecular Sieve Type 5 (Fisher Scientific Co.), was passed thereinto. The formaldehyde was passed in a 0.8 part/min. and the hexafluoroacetone at 3.98 parts/min. over a 25-minute addition period. There was employed a total of 20 parts of formaldehyde and 99.6 parts of hexafluoroacetone. The polymerization system rose in temperature from 0 to 9° C. during this period. A clear gel formed on the wall of the reactor and the medium became cloudy and syrupy.

Upon completion of the addition, the system was warmed to 50° C. within 5 minutes to remove monomers, whereupon the reaction mixture became so viscous it stopped the stirrer. The reaction product was washed with 352 parts of benzene and 792 parts of methanol and dried for 3 days at room temperature and for 6 hours at 50° C. in a vacuum oven. There was obtained 69 parts of a white, friable, pourable terpolymer of hexafluoroacetone/formaldehyde/ethylene oxide (Polymer A). A portion leached with water did not lower the pH of the water, a fact indicating the absence of free hexafluoroacetone or its hydrate.

Analysis (percent).—C, 25.31; H, 1.59; F. 57.08.

Polymer A stuck to a metal block at 88° C. and melted at 91°–98° C. By differential thermal analysis a melting point of 88° C. was observed. A translucent, colorless, brittle, self-supporting film 3.5 mils in thickness was pressed at 60° C. and 500 lbs./sq. in. pressure. A 0.5 mil coating was pressed on aluminum foil at 100° C. When the foil was creased, the coating remained intact and did not crack.

Five parts of Polymer A was heated under nitrogen at 160° C. for 40 minutes in 52.25 parts of benzyl alcohol containing 0.78 part of tri-n-butylamine. After the system had cooled, the product was filtered, washed with acetone (59 parts) and methanol (198 parts), then vacuum oven-dried at 50° C. for 7 hours and at room temperature for 11 hours. There was recovered 1.9 parts of Polymer B (38%).

*Analysis* (percent).—C, 24.56; H, 1.27; F, 57.35.

On a metal block, Polymer B stuck at 65° C. and melted at 94° to 95° C. Binary copolymers of hexafluoroacetone and formalydehyde are completely destroyed by such treatment.

Infrared absorption data on Polymer A indicated the presence of the structural units —C(CF$_3$)$_2$—O—CH$_2$O— and pyrolysis gave formaldehyde, hexafluoroacetone, and 2,2-bis(trifluoromethyl)-1,3-dioxolane. Base stability of the polymer and presence of the dioxolane derivative are evidence of the introduction of ethylene oxide into the polymer.

Since obvious modifications and equivalents in the invention will be evident to those skilled in the chemical arts, I propose to be bound solely by the appended claims.

The embodiments of the invention in which an exclusive property or privilege is claimed are defined as follows:

1. A resinous copolymer of a mixture consisting of formaldehyde and a ketone of the formula

wherein X and X' are selected from the group consisting of hydrogen, fluorine, chlorine and polyfluoroalkyl, chloropolyfluoroalkyl and alkoxypolyfluoroalkyl of up to 18 carbons, the mole ratio of formaldehyde to ketone in the polymer being in the range 1:0.01 to 1:1.

2. A resinous terpolymer of a mixture consisting of formaldehyde, a ketone of the formula

wherein X and X' are selected from the group consisting of hydrogen, fluorine, chlorine and polyfluoroalkyl, chloropolyfluoroalkyl and alkoxypolyfluoroalkyl of up to 18 carbons, the mole ratio of formaldehyde to ketone in the polymer being in the range 1:01 to 1:1, and up to 0.2 mole per mole of formaldehyde of a third component selected from the group consisting of isocyanic acid, n-butyl isocyanate, phenyl isocyanate, pivalolactone, caprolactam, isobutylene, styrene, vinyl butyl ether, ethylene oxide, propylene oxide, dioxolane, N-fluoroiminomalononitrile, acetaldehyde, butyraldehyde and chloral.

3. A resinous copolymer of a mixture consisting of formaldehyde and hexafluoroacetone, the mole ratio of formaldehyde to ketone being in the range 1:01 to 1:1.

4. A resinous copolymer of a mixture consisting of formaldehyde and s-dichlorotetrafluoroacetone, the mole ratio of formaldehyde to ketone being in the range 1:0.01 to 1:1.

5. A resinous terpolymer of a mixture consisting of formaldehyde, hexafluoroacetone and up to 0.2 mole per mole of formaldehyde of ethylene oxide, the mole ratio of formaldehyde to ketone being in the range 1:0.01 to 1:1.

6. A filament formed from a copolymer of claim 1.

7. A self-supporting film formed from a copolymer of claim 1.

8. A self-supporting film formed from a copolymer of a mixture consisting of formaldehyde and hexafluoroacetone of claim 3.

9. A self-supporting film formed from a terpolymer of a mixture consisting of formaldehyde, hexafluoroacetone and ethylene oxide of claim 5.

10. A copolymer of claim 1 which has been treated to improve thermal stability by reaction with an effective amount of a member of the group consisting of acetic anhydride, aluminum chloride, phosphorus pentachloride, triethyl orthoformate plus dimethyl sulfate, and dimethylformamide dimethyl acetal.

11. A terpolymer of claim 2 which has been treated to improve thermal stability by reaction with an effective amount of a member of the group consisting of acetic anhydride, aluminum chloride, phosphorus pentachloride, triethyl orthoformate plus dimethyl sulfate, and dimethylformamide dimethyl acetal.

12. A copolymer of a mixture consisting of formaldehyde and hexafluoroacetone of claim 3 which has been reacted with acetic anhydride to improve thermal stability.

13. A copolymer of a mixture consisting of formaldehyde and heaxfluoroacetone of claim 3 which has been reacted with phosphorus pentachloride to improve thermal stability.

14. A copolymer of a mixture consisting of formaldehyde and hexafluoroacetone of claim 3 which has been reacted with aluminum chloride to improve thermal stability.

15. A process for preparing a copolymer of claim 1 which comprises reacting, at a temperture of —80° to 30° C., (1) formaldehyde with (2) a ketone of the formula X—CF$_2$—CO—CF$_2$—X", wherein X and X" are selected from the group consisting of hydrogen, fluorine, chlorine and polyfluoroalkyl, chloropolyfluoroalkyl and alkoxypolyfluoroalkyl of up to 18 carbons.

16. The process of claim 15 accomplished in the presence of an anionic catalyst selected from the group consisting of triphenylphosphine, tritolylphosphine, triphenylstibine, triphenylbismuthine, triphenylarsine, cesium fluoride, aliphatic amines, tetralkylammonium halides, tetra-n-butylammonium laurate, trimethylstearylammonium laurate, triethylbenzylammonium acetate, and dimethyl di-(hydrogenated tallow)ammonium acetate.

17. The process of claim 16 which compries reacting formaldehyde with heaxfluoroacetone.

18. The process of claim 17 wherein the catalyst is triphenylphosphine.

19. The process of claim 17 wherein the catalyst is dimethyl di(hydrogenated tallow)ammonium acetate.

20. The process of claim 16 which comprises reacting formaldehyde with s-dichlorotetrafluoroacetone.

21. The process of claim 20 wherein the catalyst is triphenylphosphine.

22. The process for preparing a copolymer of claim 2 which comprises reacting, at a temperature of —80° to 30° C., (1) formaldehyde with (2) a ketone of the formula X—CF$_2$—CO—CF$_2$—X', wherein X and X' are selected from the group consisting of hydrogen, fluorine, chlorine and polyfluoroalkyl, chloropolyfluoroalkyl and alkoxypolyfluoroalkyl of up to 18 carbons, and (3) a member of the group consisting of isocyanic acid, n-butyl isocyanate, phenyl isocyanate, pivalolactone, caprolactam, isobutylene, styrene, vinyl butyl ether, ethylene oxide, propylene oxide, dioxolane, N-fluoroiminomalononitrile, acetaldehyde, butyraldehyde and chloral.

23. The process of claim 22 which comprises reacting formaldehyde, hexafluoroacetone and vinyl n-butyl ether.

24. A solid resinous copolymer of a mixture consisting of formaldehyde and a ketone selected from the group consisting of perfluoroacetone, tetrafluoroacetone, and dichlorotetrafluoropropanone, the components being joined in the polymer chain through oxygen atoms, and mole ratio of formaldehyde to ketone in the polymer being in the range of 1:0.01 to 1:1.

25. A solid resinous copolymer of a mixture consisting of formaldehyde and perfluoroacetone, the components being joined in the polymer chain through oxygen atoms, and the mole ratio of formaldehyde to ketone in the polymer being in the range of 1:0.01 to 1:1.

26. A solid resinous copolymer of a mixture consisting of formaldehyde and ketone selected from the group consisting of hexafluoroacetone and tetrafluorodichloroacetone, the mole ratio of formaldehyde to ketone being in the range 1:0.01 to 1.0.

27. A solid resinous copolymer of a mixture consisting of formaldehyde and tetrafluoroacetone, the mole ratio of formaldehyde to tetrafluoroacetone being in the range 1:0.01 to 1.0.

28. A solid resinous copolymer of a mixture consisting of formaldehyde and pentafluoromonochloroacetone, the mole ratio of formaldehyde to pentafluoromonochloroacetone being in the range 1:0.01 to 1.0.

29. A solid resinous copolymer of a mixture consisting of formaldehyde and perfluoro-4-heptanone, the mole ratio of formaldehyde to perfluoro-4-heptanone being in the range 1:0.01 to 1.0.

30. A solid resinous copolymer of a mixture consisting of formaldehyde, a ketone selected from the group consisting of hexafluoroacetone, tetrafluorodichloroacetone, pentafluoromonochloroacetone, and perfluoro-4-heptanone, the mole ratio of formaldehyde to ketone being in the range 1:0.01 to 1.0, and up to 0.2 mole per mole of formaldehyde of a third component selected from the group consisting of ethylene oxide and propylene oxide.

31. A process for preparing a solid resinous copolymer of a mixture consisting of formaldehyde and a ketone which comprises reacting at a temperature of about $-80°$ C. to $30°$ C. (1) formaldehyde with (2) a ketone selected from the group consisting of hexafluoroacetone, tetrafluorodichloroacetone, and pentafluoromonochloroacetone, the mole ratio of formaldehyde to ketone being in the range 1:0.01 to 1.0 in the presence of cesium fluoride as a catalyst.

References Cited

UNITED STATES PATENTS

| | | | |
|---|---|---|---|
| 2,641,591 | 6/1953 | Gagrine | 260—64 |
| 2,683,133 | 7/1954 | Harvey et al. | 260—64 |
| 2,807,646 | 9/1957 | Miller et al. | 260—593.5 |
| 2,917,546 | 12/1959 | Gordon et al. | 260—593.5 |
| 3,006,973 | 10/1961 | Hauptschein et al. | 260—593.5 |
| 3,118,851 | 1/1964 | Harvey et al. | 260—64 |

FOREIGN PATENTS 510,532   3/1955   Canada.

WILLIAM H. SHORT, Primary Examiner

L. L. LEE, Assistant Examiner

U.S. Cl. X.R.

117—132, 161; 260—2, 32.8, 67, 77.5, 78.3, 91.1, 93.5, 94.8